(No Model.)
J. B. UNDERWOOD.
Elevator.
No. 238,734.  Patented March 8, 1881.
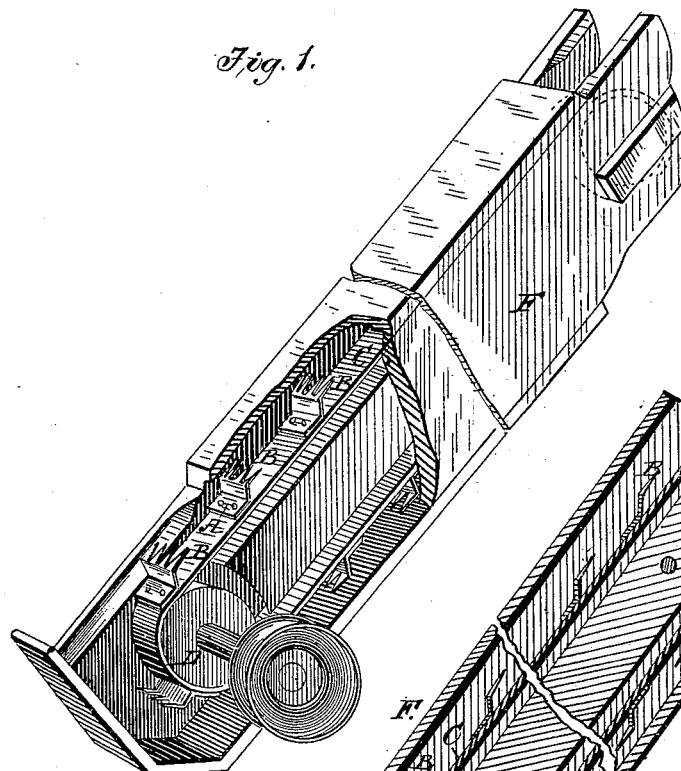
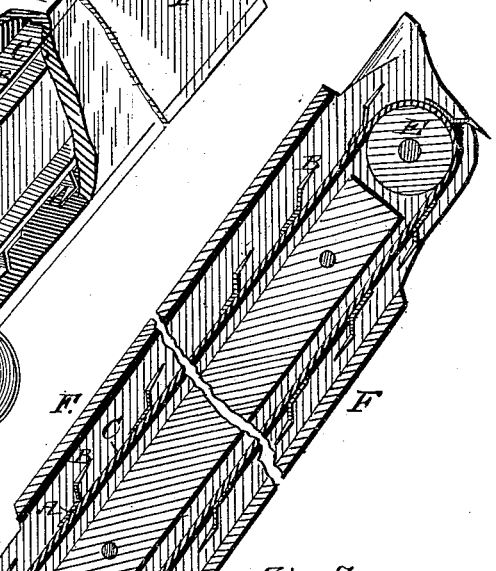
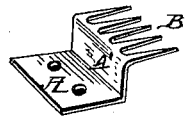
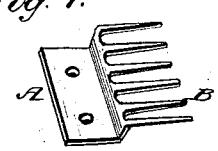
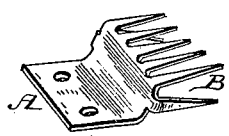
Witnesses.
Fred G. Dietrich
A. H. Krause
Inventor
Joseph B. Underwood
by A. Peterson & Co.
his Attorneys.
N. PETERS, PHOTO-LITHOGRAPHER, WASHINGTON, D C.

UNITED STATES PATENT OFFICE.

JOSEPH B. UNDERWOOD, OF FAYETTEVILLE, ASSIGNOR TO W. C. TROY, OF CUMBERLAND COUNTY, NORTH CAROLINA.

ELEVATOR.

SPECIFICATION forming part of Letters Patent No. 238,734, dated March 8, 1881.

Application filed August 31, 1880. (No model.)

*To all whom it may concern:*

Be it known that I, JOSEPH B. UNDERWOOD, of Fayetteville, in the county of Cumberland and State of North Carolina, have invented certain new and useful Improvements in Elevators; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of the lower end of an elevator-chute embodying my improvement. Fig. 2 is a longitudinal section of the chute with its endless apron or carrier; and Figs. 3, 4, 5, 6, and 7 are perspective detail views representing modified forms of the toothed seed-buckets.

Similar letters of reference indicate corresponding parts in all the figures.

My invention relates to elevators that are adapted to discharge or unload seed-cotton, or seed of a similar nature which is coated with fine fibers, from a wagon or other conveyance, into the upper stories of a gin-house or warehouse where the seed is to be stored, experience having shown that the ordinary grain carriers or elevators are not adapted for this purpose, owing to the peculiar nature of the seed; and it consists, essentially, in a peculiar construction of the elevator-buckets, substantially as hereinafter more fully set forth.

Instead of the ordinary scoops or buckets, I employ toothed buckets, which are, by preference, cut and stamped from sheet-iron of the requisite thickness and stiffness, so as to form a flat base-piece, A, by which the bucket is riveted upon the endless carrier belt or apron C, and a series of projecting teeth or fingers, B. These teeth should be about three-fourths of an inch long each, and about one-fourth of an inch apart, so that they will easily take hold of the closely-matted seed-cotton, and yet not retain the fibers after the seed-cotton has been discharged at the upper end of the chute, as is the case with the card-clothing that has heretofore been used, to some extent, for this purpose, but which soon becomes choked up by the fine seed-fibers, and is thereby rendered inoperative and useless. There are several ways of cutting and shaping these toothed buckets, as will appear by reference to Figs. 3, 4, 5, 6, and 7 of the drawings, all of which, however, operate in substantially the same manner. A suitable number of these buckets are riveted or otherwise secured upon the endless apron C, which is suspended between and operated by pulleys D E within the elevator chute or casing F.

The power for operating the apron may be applied to the shaft of either one of the pulleys, and as these are rotated and the lower end or mouth, F, of the chute inserted into a wagon-load of seed-cotton, the seed is caught in the toothed buckets and discharged at the upper end of the chute. It is obvious that by reversing the position of this it may be used to discharge the seed from the loft and load a wagon or other conveyance below, instead of unloading this. As the belt or apron is turned around the pulleys at either end, the teeth of the bucket which is at that moment on the turning-point will project outwardly from the belt, so as in the one case (at the lower end of the chute) to be carried into and get a good hold of the seed, while in the other case (at the upper end of the chute) this hold is again released by the widening distance between the teeth and belt, so as to admit of the easy discharge of the seed grasped by the bucket.

Having thus described my invention, I claim and desire to secure by Letters Patent of the United States—

1. An elevator bucket or cup for cotton-seed or analogous fiber-coated seed, composed of a flat base-plate, A, having a series of projecting teeth or fingers, B, substantially as set forth.

2. An elevator bucket or cup for cotton-seed or analogous fiber-coated seed, composed of a flat base-plate, A, an intermediate raised section, A', and a series of teeth or fingers, B, projecting from said raised section, substantially as set forth.

3. The endless carrier belt or apron C, provided with buckets a suitable distance apart, and each composed of a base-plate, A, and a series of projecting teeth or fingers, B, substantially as set forth.

4. The combination of the chute F, pulleys D E, endless apron C, and seed-buckets A B, when constructed and arranged to operate substantially in the manner and for the purpose herein shown and described.

In testimony that I claim the foregoing as my own I have hereto affixed my signature in presence of two witnesses.

JOSEPH B. UNDERWOOD.

Witnesses:
  JAS. C. MACRAE,
  GEO. M. ROSE.